(12) United States Patent
Schaub et al.

(10) Patent No.: US 11,573,625 B2
(45) Date of Patent: Feb. 7, 2023

(54) PICTOGRAMS AS DIGITALLY RECOGNIZABLE TANGIBLE CONTROLS

(71) Applicant: AT&T Intellectual Property I, L.P., Atlanta, GA (US)

(72) Inventors: Ryan Schaub, Berkeley Lake, GA (US); Barrett Kreiner, Woodstock, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/359,851

(22) Filed: Jun. 28, 2021

(65) Prior Publication Data

US 2022/0413595 A1 Dec. 29, 2022

(51) Int. Cl.
| | | |
|---|---|---|
| *G06F 3/01* | (2006.01) | |
| *G06F 16/54* | (2019.01) | |
| *G06V 10/10* | (2022.01) | |
| *G06V 30/422* | (2022.01) | |
| *G06V 30/10* | (2022.01) | |

(52) U.S. Cl.
CPC .............. *G06F 3/01* (2013.01); *G06F 16/54* (2019.01); *G06V 10/10* (2022.01); *G06V 30/422* (2022.01); *G06V 30/10* (2022.01)

(58) Field of Classification Search
CPC ........... G06F 3/01; G06F 16/54; G06V 10/10; G06V 30/422; G06V 30/10
See application file for complete search history.

(56) References Cited

U.S. PATENT DOCUMENTS

| | | | | |
|---|---|---|---|---|
| 2015/0277745 A1* | 10/2015 | Qian | ................... | G06F 16/5854 |
| | | | | 715/863 |
| 2019/0215460 A1* | 7/2019 | Chen | ................... | H05B 47/115 |
| 2020/0349543 A1* | 11/2020 | Gilbert | ................... | G07F 9/002 |

* cited by examiner

*Primary Examiner* — Premal R Patel
(74) *Attorney, Agent, or Firm* — Hartman & Citrin LLC

(57) ABSTRACT

Concepts and technologies disclosed herein are directed to pictograms as digitally recognizable tangible controls. According to one aspect disclosed herein, a user system can include a processing component and a memory component. The memory component can include instructions of a pictogram digitization module. The user system can capture, via a camera component, an image containing a pictogram that is a digitally recognizable tangible manifestation of a digital control. The user system can determine, via the pictogram digitization module, the digital control associated with the pictogram. The user system can implement, via the pictogram digitization module, the digital control. The digital control can include a digital content, an action, or a context. The user system can create, via the pictogram digitization module, a digital interface that includes the digital control. In some embodiments, the pictogram includes a formal pictogram. In other embodiments, the pictogram includes an informal pictogram.

20 Claims, 9 Drawing Sheets

PICTOGRAMS AS DIGITALLY RECOGNIZABLE TANGIBLE CONTROLS

BACKGROUND

Human-machine interfaces enable humans to interact with machines such as computers, vehicles, smartphones, kiosks, and other systems and devices. Human-machine interfaces allow users to provide input to a machine and receive a corresponding output from the machine. A keyboard is one of the most common and widely used human-machine interfaces. Input provided via a keyboard can be interpreted by a computer application that performs some action in response. For example, a series of key presses on a keyboard can be interpreted by a word processing application as letters to be presented on a display. Other common human-machine interfaces include computer mice, video game controllers, touchpads, and touchscreens.

Over the past several years, human-machine interfaces have become increasingly less tangible, foregoing analog controls for digitized controls. This is evidenced by the proliferation of touchscreens in everything from smartphones to vehicle infotainment and HVAC controls. Since touchscreens lack inherent feedback, many touchscreens utilize a haptic feedback layer to provide tangible feedback to users. In addition to touch, gesture-based control systems that utilize free space gestures have been incorporated into many applications. While these gestures are unique, intuitive, and may be entertaining as a novel feature, no tangible feedback is provided to the user in response the gestures performed.

SUMMARY

Concepts and technologies disclosed herein are directed to pictograms as digitally recognizable tangible controls. According to one aspect disclosed herein, a user system can include a processing component and a memory component. The memory component can include instructions of a pictogram digitization module that, when executed by the processing component, cause the user system to perform operations. The pictogram digitization module can be separate from or integrated with one or more applications such as web browser applications, productivity applications, video game applications, entertainment applications, creative applications, native applications, web-based applications, any combination thereof, and/or the like. The pictogram digitization module can be implemented as an application programming interface ("API") that can be called by the application(s). In some embodiments, the pictogram digitization module is part of an API that combines the functionality of the pictogram digitization module with optical character recognition ("OCR"), handwriting recognition, gesture recognition other recognition technologies, or some combination thereof. The pictogram digitization module can be implemented as a plug-in to one or more of the applications. Other implementations of the pictogram digitization module are contemplated, and as such, the examples provided herein should not be construed as being limiting in any way.

The user system can initialize the pictogram digitization module and can capture, via a camera component, an image containing a pictogram that is a digitally recognizable tangible manifestation of a digital control. The image can be a static image or a video image. The pictogram can be a formal pictogram (e.g., a registered trademark symbol) or an informal pictogram (e.g., user created). The user system can execute the pictogram digitization module to determine the digital control associated with the pictogram. In some embodiments, the pictogram digitization module can perform a lookup operation on a pictogram database. The pictogram database can include identifying information about the pictogram that is stored in association with the digital control. The user system can execute the pictogram digitization module to implement the digital control.

In some embodiments, the digital control includes one or more digital contents. The digital content can include, but is not limited to, a web address, an image, a video, a file, a downloadable digital item, an application, a setting, a configuration, some combination thereof, and/or the like. In some embodiments, the digital control includes one or more actions. The action(s) can cause the user system (or any component thereof), one or more applications, one or more networks, one or more other systems, and/or one or more services provided, at least in part, by the other system(s) to perform one or more operations. In some embodiments, the digital control includes one or more contexts. The context(s) can define how the action(s) are to be interpreted by the user system, the application(s), the network(s), the other system(s), and/or the service(s). The digital control can include any combination of one or more digital contents, one or more actions, and/or one or more contexts.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

The concepts and technologies disclosed herein facilitate the use of a pictogram as a digitally recognizable tangible manifestation of a digital control. In one aspect disclosed herein, the pictogram can be considered a non-conforming two-dimensional bar code in that the pictogram is recognizable by a computer and can represent information. The disclosed pictograms, however, significantly differ in many ways from traditional bar codes. For example, the movement of the pictogram in space and/or over time can convey one or more contents, one or more actions, and/or one or more contexts. Moreover, pictograms can be contextually modifiable, whereas bar codes convey content and may indicate a predetermined digital action (e.g., opening a web page) but have no other context. In some embodiments, pictogram context can be hierarchical in nature but also can be overlapping.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
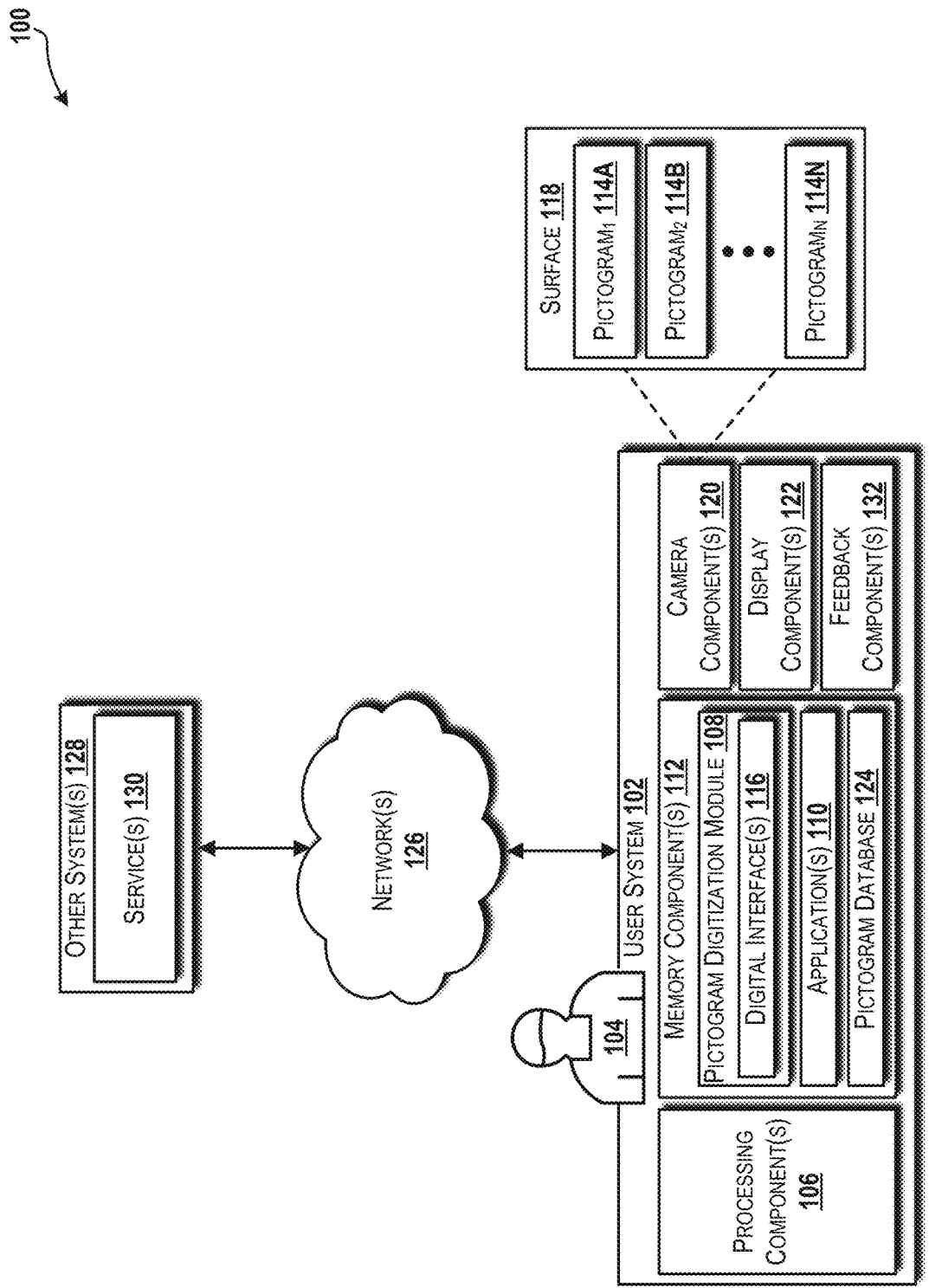
FIG. 1 is a block diagram illustrating aspects of an illustrative operating environment for various concepts disclosed herein.

Turning now to FIG. 1, an operating environment 100 in which embodiments of the concepts and technologies disclosed herein will be described. The operating environment 100 includes a user system 102 associated with a user 104. The user system 102 can be embodied as a personal computer (e.g., laptop, desktop, or tablet), a video game system, a set-top device, a mobile device (e.g., a smartphone), an Internet of Things ("IoT") device, a vehicle infotainment system, or the like. An example of the user system 102 embodied as a computer is illustrated and described herein with reference to FIG. 4. An example of the user system 102 embodied as a mobile device such as a smartphone is illustrated and described herein with reference to FIG. 5.

The user system 102 can include one or more processing components 106 that can execute instructions of a pictogram digitization module 108 and one or more applications 110 stored in one or more memory components 112. The pictogram digitization module 108 can recognize one or more pictograms 114A-114N (hereinafter referred to collectively as "pictograms 114" or individually as "pictogram 114") to be used as a digitally recognizable tangible manifestation of a digital control. The pictogram digitization module 108, in response to recognizing one or more of the pictograms 114, can create one or more digital interfaces 116 that allow the user system 102 and/or the user 104 to create stateful and dynamic digital experiences with one or more physical objects and/or one or more pictograms 114 as a control to interact with the application(s) 110 and/or other aspects of the user system 102 (e.g., power ON/OFF).

The pictograms 114 can be or can include any graphic symbol that represents any idea or concept, independent of any particular language and specific words or phrases. The graphic symbols can be comprehensible only by familiarity with prior convention. The graphic symbols can convey meaning through pictorial resemblance to a physical object. The graphic symbols can be or can include elemental symbols from a set of pre-defined symbols intended to represent a readable character for the purpose of writing and thereby expressing thoughts, ideas, and/or concepts. The pictograms 114 can be formal (e.g., printed, imprinted, or rendered) or informal (e.g., hand drawn). Some non-limiting examples of formal and informal pictograms 114 are illustrated and described with reference to FIGS. 2A-2C.

In the illustrated example, the pictograms 114 are associated with a surface 118. It should be understood, however, that the pictograms 114 may be standalone and not associated with the surface 118. The surface 118 can be any surface made of any material such as, but not limited to, paper, wood, stone, plastic, metal, composite, any combination thereof, and/or the like. The surface 118 can be any shape. The surface 118 can be part of any object. The surface 118 can be part of a building (e.g., a wall or floor). The surface 118 can be part of furniture. The surface 118 can be an electronic device, including a functional electronic device or a non-functional electronic device (e.g., an old computer mouse; shown in FIG. 2B). The surface 118 can resemble an existing device, such as a stone shaped like a computer mouse (also shown in FIG. 2B). The pictograms 114 can be applied to the surface 118 as a self-adhering sticker (e.g., adhesive or static). The pictograms 114 can be attached to the surface 118 using tape, adhesive, hook and loop, any combination thereof, and/or the like.

The pictogram digitization module 108 can recognize the pictograms 114 via one or more camera components 120. The camera component(s) 120 can include an internal camera component of the user system 102. For example, the user system 102 may be a laptop computer that includes an integrated camera. Alternatively, the camera component(s) 120 can be built-in to another component of the user system 102, such as one or more display components 122. The camera component(s) 120 alternatively can be one or more standalone camera components. The camera component(s) 120 can utilize any camera sensor technology, some examples of which include charge-coupled device ("CCD") and complementary metal-oxide semiconductor ("CMOS"). The sensor size and/or other specifications of the camera component(s) 120 can be selected based upon the needs of a given application. The camera component(s) 120 can be configured to capture still images and/or video images.

The pictogram digitization module 108 can be separate from or integrated with one or more of the applications 110. The applications 110 can include web browser applications, productivity applications, video game applications, entertainment applications, creative applications, native application, web-based applications, any combination thereof, and/or the like. The pictogram digitization module 108 can be implemented as an application programming interface ("API") that can be called by the application(s) 110. In some embodiments, the pictogram digitization module 108 is part of an API that combines the functionality of the pictogram digitization module 108 with optical character recognition ("OCR"), handwriting recognition, gesture recognition other recognition technologies, or some combination thereof. The pictogram digitization module 108 can be implemented as a plug-in to one or more of the applications 110. Other implementations of the pictogram digitization module 108 are contemplated, and as such, the examples provided herein should not be construed as being limiting in any way.

The pictograms 114 can be associated with one or more digital controls that utilize one or more pieces of digital content, one or more actions, and/or one or more contexts. Static images, textual descriptions, and/or other identifying information about the pictograms 114 can be stored in a pictogram database 124 in association with the digital content, action(s), and/or context(s). The pictogram digitization module 108 can perform a lookup operation on the pictogram database 124 to obtain the digital content, action(s), and/or context(s) associated with particular pictograms 114. The digital content can include, but is not limited to, a web address, an image, a video, a file, a downloadable digital item, an application, a setting, a configuration, some combination thereof, and/or the like. The action(s) can cause the user system 102 (or any component thereof), the application(s) 110, one or more networks 126 (best shown in FIG. 6), one or more other systems 128, and/or one or more services 130 provided, at least in part, by the other system(s) 128 to perform one or more operations. The context(s) can define how the action(s) are to be interpreted by the user system 102, the application(s) 110, the network(s) 126, the other system(s) 128, and/or the service(s) 130.

A context can be a global context, including industry standard contexts such as "enter," "cancel," "open," "close," and the like. A global context can be protected (formal), personal, or both. A protected context can be created for and assigned to logical groups, such as for government or corporate use. A protected context may not be recognized and accessed outside a particular domain such as within a specific business. A protected context can override a global context and reassign content(s), action(s), and/or subordinate context(s). A personal context can override a global context and reassign content(s), action(s), and/or subordinate context(s) for the user 104. Some global and/or protected contexts may be specifically protected from override. Informal pictograms can create new or transient personal contexts. Personal contexts can be shared digitally.

In some embodiments, the pictograms 114 can be considered, in one aspect, a non-conforming two-dimensional bar code in that the pictograms 114 are recognizable (e.g., by the camera component(s) 120) and represent information. The pictograms 114 differ from traditional bar codes in that the movement of the pictograms 114 in space and over time can convey content, action, and/or context. Moreover, the pictograms 114 can be contextually modifiable, whereas bar codes simply convey content and may indicate a predetermined digital action (e.g., open a web page), but have no other context. The pictograms 114 can include contexts that are hierarchical in nature (e.g., proper subset), but also can be overlapping (e.g., union).

In some embodiments, the user 104 can interact with the pictograms 114. For example, the user 104 can press the pictogram 114 as if the pictogram 114 was a button. The user system 102, via one or more feedback components 132 and at the control of the pictogram digitization module 108, can provide feedback to the user 104 when the user 104 interacts with the pictogram 114. The feedback component(s) 132 can be configured to provide auditory feedback, visual feedback, and/or tactile feedback. The feedback component(s) 132 can be or can include secondary input devices, microphones, gyroscopes, accelerometers, lidar, other sensors, and the like. Information about any feedback associated with the pictograms 114 and specific interactions that prompt the feedback can be stored in the pictogram database 124.

Returning to the user system 102, the processing components 106 can include a central processing unit ("CPU") configured to process data, execute computer-executable instructions of one or more application programs (e.g., the pictogram digitization module 108 and the application(s) 110), and communicate with other components of the user system 102 in order to perform various functionality described herein. In some embodiments, the processing components 106 can include a graphics processing unit ("GPU") configured to accelerate operations performed by the CPU, including, but not limited to, general-purpose scientific and engineering computing applications, as well as graphics-intensive computing applications such as high resolution video (e.g., 480i/p, 720i/p, 1080i/p, 4K, 8K, and greater resolutions), video games, three-dimensional modeling applications, and the like. In some embodiments, the processing components 106 can communicate with a discrete GPU (not shown). In any case, the CPU and GPU can be configured in accordance with a co-processing CPU/GPU computing model, wherein the sequential part of an application executes on the CPU and the computationally-intensive part is accelerated by the GPU. In some embodiments, the processing components 106 can be part of a system-on-chip ("SoC") along with one or more of the other components described herein below. For example, the SoC can include the processing components 106 and the memory component(s) 112. In some embodiments, the processing components 106 can be fabricated, in part, utilizing a package-on-package ("PoP") integrated circuit packaging technique. Moreover, the processing components 106 can be single core or multi-core processors. The processing components 106 can be created in accordance with an ARM architecture, available for license from ARM HOLDINGS of Cambridge, United Kingdom. Alternatively, the processing components 106 can be created in accordance with an x86 architecture, such as is available from INTEL CORPORATION of Mountain View, Calif. and others. In some embodiments, the processing components 106 can be or can include a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 112 can include random access memory ("RAM"), read-only memory ("ROM"), integrated storage memory, removable storage memory, or any combination thereof. In some embodiments, at least a portion of the memory components 112 is integrated with the processing components 106. In some embodiments, the memory components 112 are configured to store a firmware, an operating system or a portion thereof (e.g., operating system kernel), one or more applications (e.g., the pictogram digitization module 108 and/or the application(s) 110), and/or a bootloader to load an operating system kernel. Integrated storage memory can include a solid-state memory, a hard disk, or a combination of solid-state memory and a hard disk. The integrated storage memory can be soldered or otherwise connected to a logic board upon which the processing components 106 and other components described herein also may be connected. The integrated storage memory can store an operating system or portions thereof, application programs, data, and other software components described herein. Removable storage memory can include a solid-state memory, a hard disk, or a combination of solid-state memory and a hard disk. In some embodiments, the removable storage memory is provided in lieu of the integrated storage memory. In other embodiments, the removable storage memory is provided as additional optional storage. In some embodiments, the removable storage memory is logically combined with the integrated storage memory such that the total available storage is made available and shown to a user as a total combined capacity. The removable storage memory can be inserted into a removable storage memory slot (not shown) or other mechanism by which the removable storage memory is inserted and secured to facilitate a connection over which the removable storage memory can communicate with other components of the user system 102, such as the processing components 106. The removable storage memory can be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like. It should be understood that the memory components 112 can store an operating system. According to various embodiments, the operating system includes, but is not limited to, LINUX, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The display components 122 can be or can include one or more monitors, televisions, projectors, virtual reality ("VR") headsets, and/or other display devices. The display components 122 can be standalone and connected to the user system 102 via a video cable such as high definition media interface ("HDMI") or DisplayPort. The display components 122 alternatively can be integrated into the user system 102 (e.g., a laptop with an integrated display).

Figure 2B:
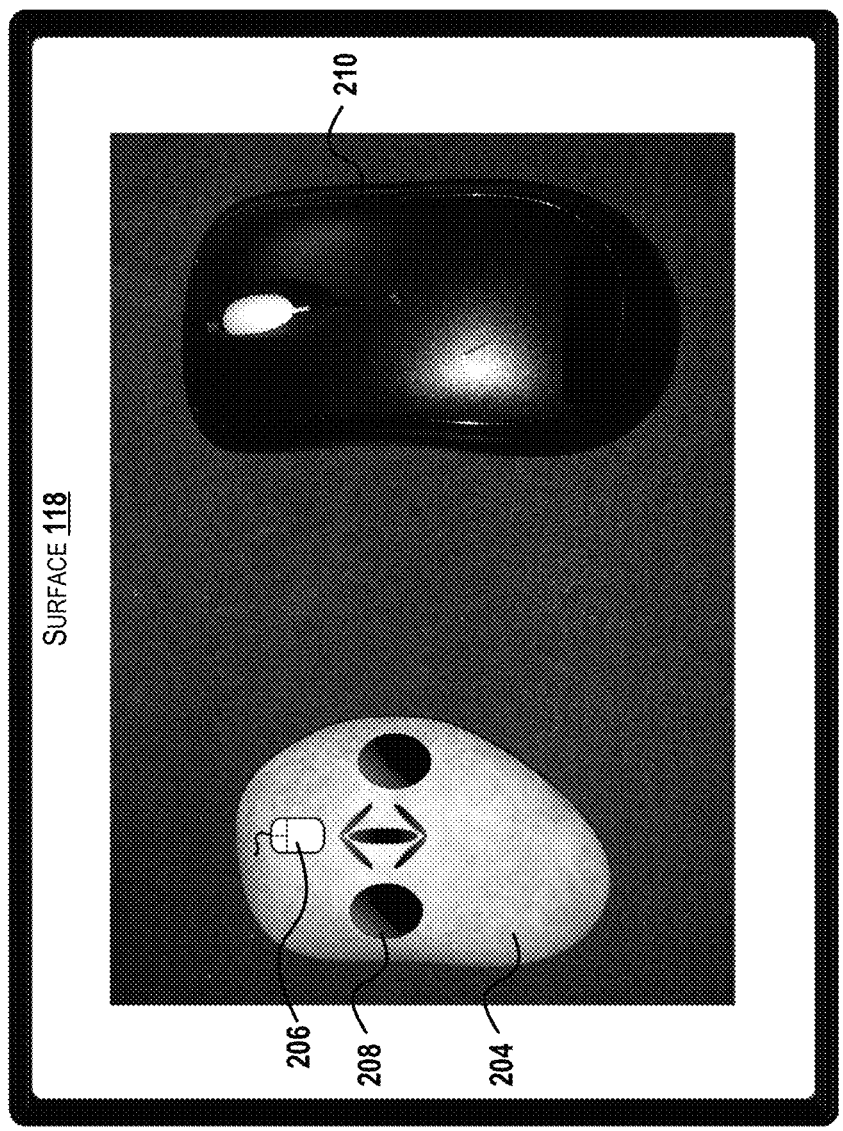
FIGS. 2A-2C are diagrams illustrating various example pictograms, according to illustrative embodiments.
Figure 2A:
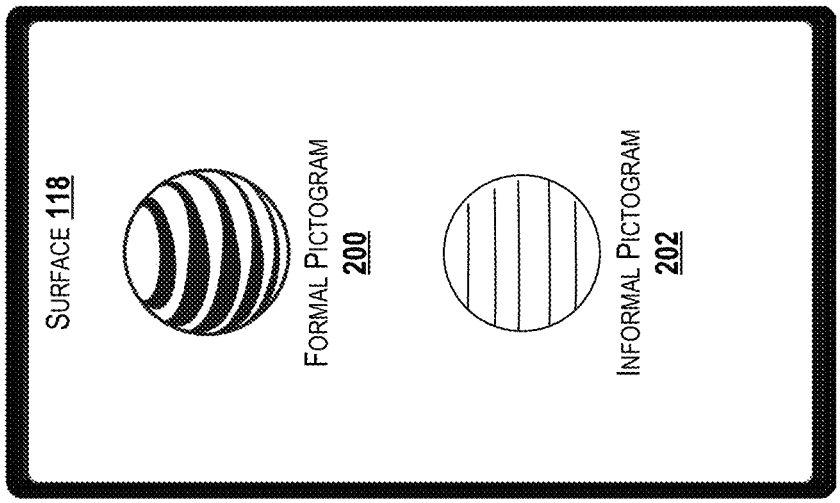
Figure 2C:
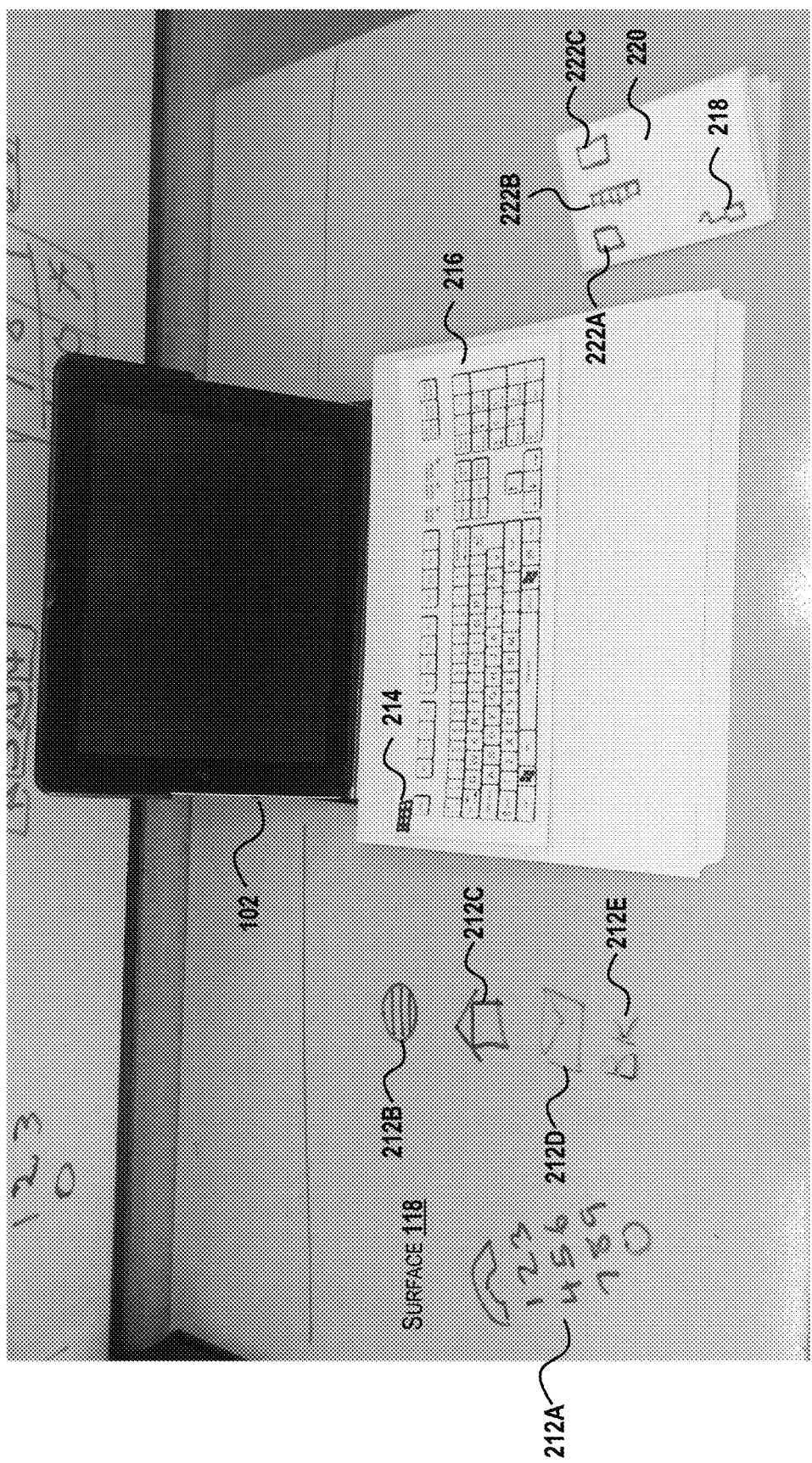

Turning now to FIGS. 2A-2C, several example types of pictograms 114 will be described, according to illustrative embodiments. FIG. 2A shows the surface 118 on which a formal pictogram 200 and an informal pictogram 202 have been placed. The formal pictogram 200 is a logo image for a company. The formal pictogram 200 can include a trademarked image. The informal pictogram 202 is a drawing of the same logo image for the same company. Upon the user 104 interacting with the formal pictogram 200, the user system 102 can perform an action that has been associated with the formal pictogram 200 and stored in the pictogram database 124. The action may be established by the company associated with the logo image depicted in the formal pictogram 200 or some other entity. The informal pictogram 202 can function in the same, similar, or a different way. Since the user 104 can create the informal pictogram 202 (e.g., by drawing on the surface 118), they can assign any action to be taken by the user system 102 in response to the user 104 interacting with the informal pictogram 202. The action can be stored in the pictogram database 124 in association with information that identifies the informal pictogram 202, including, for example, a static image thereof. In these examples, by touching the formal pictogram 200 or the informal pictogram 202, and the camera component 120 recognizing that the formal pictogram 200 or the informal pictogram 202 has been touched, the pictogram digitization module 108 can perform a lookup operation on the pictogram database 124 to determine the action(s) to be performed.

FIG. 2B shows the surface 118 on which a rock 204 has been adorned with a mouse pictogram 206 and mouse controls 208. The mouse pictogram 206 can be recognized by the pictogram digitization module 108 through an image captured by the camera component(s) 120. The pictogram digitization module 108 can perform a lookup operation on the pictogram database 124 to determine a control context associated with the mouse pictogram 206. In this example, the control context can include the basic functionality of a computer mouse to navigate a cursor or other user interface element around the display component(s) 122. The user 104 can then move the rock 204 as if the rock 204 was a real computer mouse. The control context also defines other functionality of the mouse pictogram 206 through the user's 104 interaction with the mouse controls 208. As such, a hierarchy can exist that first defines the mouse pictogram 206 as an analog to a real computer mouse and subsequently defines of each of the mouse controls 208. For example, one of the mouse controls 208 can be assigned a left-click action, another of the mouse controls 208 can be assigned a right-click action, and another of the mouse controls 208 can be assigned a scroll wheel action. It should be understood that although the rock 204 is used in the illustrated example, other non-electronic objects can be used as the analog for a real computer mouse. Moreover, the shape of the rock 204 was selected since it resembles a real computer mouse and therefore may provide a similar feel in terms of ergonomics. The concepts and technologies disclosed herein are flexible such that any object can be used as the analog for a real computer mouse.

FIG. 2B also shows an inoperable computer mouse 210 as the pictogram 114. The concepts and technologies can breathe new life into old, inoperable electronic devices, such as the inoperable computer mouse 210. The pictogram digitization module 108 can recognize the inoperable computer mouse 210 and consult the pictogram database 124 for the functionality it should provide. It is contemplated that the pictogram database 124 can include a catalog of inoperable electronic devices that have some known functionality. It is further contemplated that the user 104 and/or another entity can add to the pictogram database 124 to define new functionality for old devices.

FIG. 2C shows the surface 118 on which the user 104 has created several hand-drawn pictograms 212A-212E. A first hand-drawn pictogram 212A illustrates a telephone keypad. Upon the user 104 interacting with the first hand-drawn pictogram 212A, the user system 102 can perform actions that have been associated with first hand-drawn pictogram 212A and stored in the pictogram database 124. These actions can include telephone keypad functionality. In this manner, the user 104 can have a working telephone interface anywhere. A second hand-drawn pictogram 212B is similar to the informal pictogram 202 introduced above. In this example, the user 104 may interact with the second hand-drawn pictogram 212B to connect to a website associated with the logo. A third hand-drawn pictogram 212C is a home button that can be used to return to a home screen on the user system 102. The home button can be assigned other functionality at the user's 104 discretion. A fourth hand-drawn pictogram 212D is a letter icon that can be used to initiate an email application or create a new email, for example. A fifth hand-drawn pictogram 212E depicts example initials of the user 104, which can be associated, for example, with a business contact card that contains contact information of the user 104. The database entry for the initials associated with the business contact card can be shared with other users (not shown) so that the other users can simply write the initials of the user 104 and access the contact information of the user 104.

FIG. 2C also shows a keyboard pictogram 214 that has been handwritten on a piece of paper printed with a keyboard graphic (shown generally as "paper keyboard" 216). The keyboard pictogram 214 can be associated with keyboard actions typical of a standard QWERTY keyboard or other keyboard style. The paper keyboard 216 can aid the user 104 in understanding the location of the "keys." Alternatively, the keyboard pictogram 214 can be placed on other parts of the surface 118 without the paper keyboard 216. In the illustrated example, the camera component 120 can record video of the user 104 typing on the paper keyboard 216 and cause the user system 102 to perform actions that coincide with the user's 104 key presses. These actions can be obtained from the pictogram database 124.

FIG. 2C also shows a mouse pictogram 218 that has been handwritten on a piece of paper printed with a mouse graphic (shown generally as "paper mouse" 220). The paper mouse 220 can be associated with mouse buttons, including a left mouse button 222A, a scroll wheel 222B, and a right mouse button 222C. In the illustrated example, the camera component 120 can record video of the user 104 moving the paper mouse 218 and using the mouse buttons 222A-222C and can cause the user system 102 to perform various actions. These actions can be obtained from the pictogram database 124.

Figure 3:
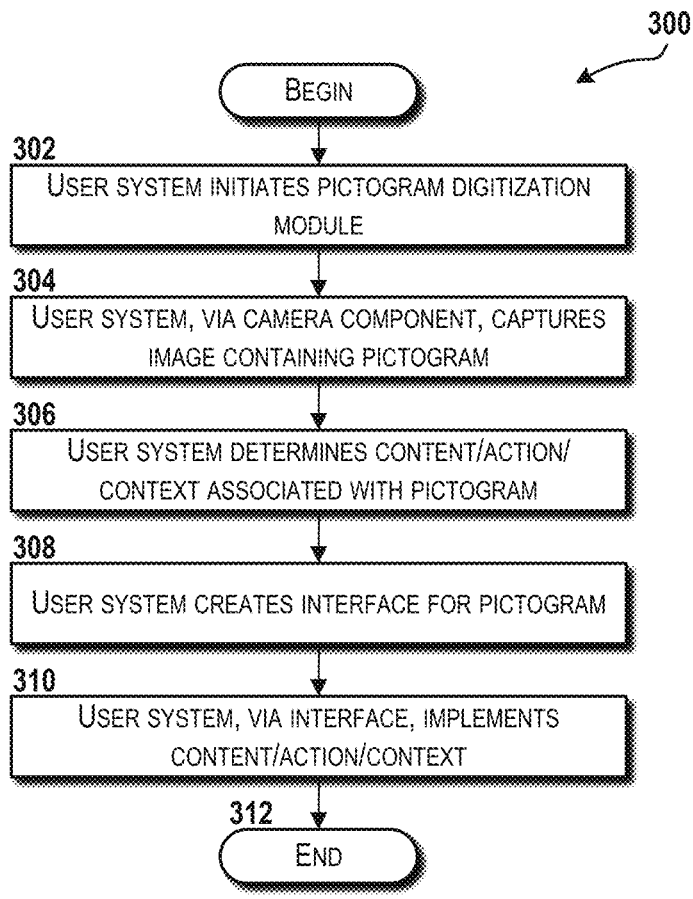
FIG. 3 is a flow diagram illustrating aspects of a method for providing pictograms as digitally recognizable tangible controls, according to an illustrative embodiment.

Turning now to FIG. 3, a flow diagram illustrating aspects of a method 300 for using pictograms 114 as digitally recognizable tangible controls will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, for example, the processing component(s) 106 of the user system 102, to perform one or more operations, and/or causing the processor to direct other components of the computing system or device to perform one or more of the operations.

For purposes of illustrating and describing the concepts of the present disclosure, operations of the methods disclosed herein are described as being performed by alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 begins and proceeds to operations 302. At operation 302, the user system 102 initiates the pictogram digitization module 108. From operation 302, the method 300 proceeds to operation 304. At operation 304, the user system 102, via the camera component 120, captures an image containing one or more pictograms 114. The image can be a static image or a video image. The type of image can be based upon the pictogram 114. For example, the formal pictogram 200 and the informal pictogram 202 shown in FIG. 2A can be identified using a static image only, whereas in FIG. 2B, the mouse pictogram 206 on the rock 204 can be identified using a static image and then the use of the rock 204 for mouse movement and interaction with the mouse controls 208 can be identified using a video image.

From operation 304, the method 300 proceeds to operation 306. At operation 306, the user system 102, via the pictogram digitization module 108, determines one or more pieces of content, one or more actions, and one or more contexts associated with the pictogram(s) 114 by performing a lookup operation on the pictogram database 124. From operation 306, the method 300 proceeds to operation 308.

At operation 308, the user system 102 creates one or more digital interfaces 116 for the pictogram(s) 114 based upon the content(s), the action(s), and/or the context(s) determined at operation 306. The digital interface(s) 116 can include digital representations of traditional keyboard controls such as simple characters (e.g., "Q", "W", "E", "R", "T", "Y"), application-specific functionality via function keys (e.g., "F1-Help") or dedicated keys such as to launch specific applications, operating system functionality (e.g., start menu button), system controls (e.g., power button and/or reset button), and/or the like. From operation 308, the method 300 proceeds to operation 310. At operation 310, the user system 102, via the digital interface(s) 116, implements the content(s), the action(s), and/or the context(s) as the user 104 interacts with the pictogram(s) 114.

From operation 310, the method 300 proceeds to operation 312. The method 300 can end at operation 312.

Figure 4:
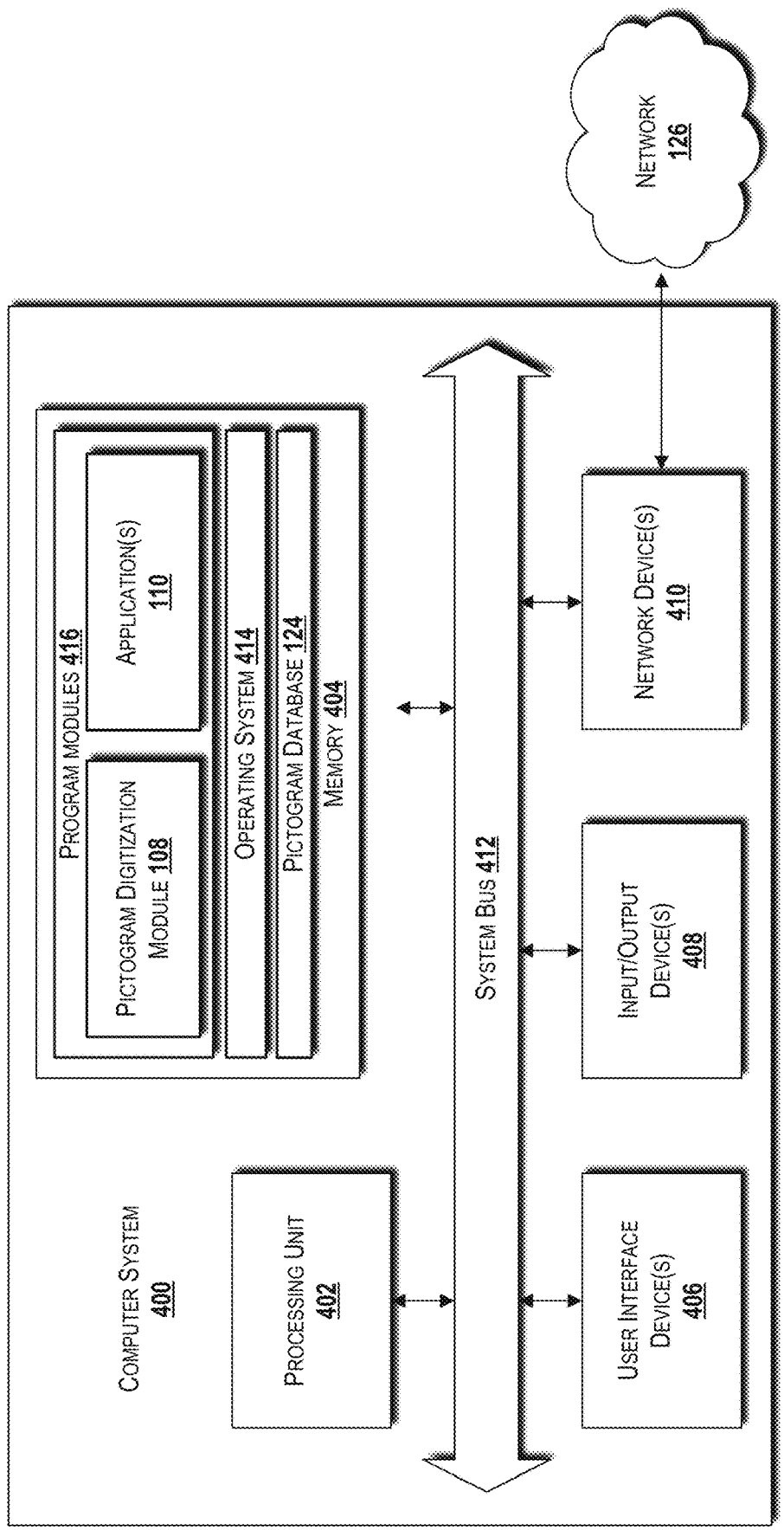
FIG. 4 is a block diagram illustrating an example computer system, according to some illustrative embodiments.

Turning now to FIG. 4, a block diagram illustrating a computer system 400 will be described, according to an illustrative embodiment. In some embodiments, the user system 102 and/or the other system(s) 128 is/are configured the same as or similar to the computer system 400. The computer system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 402 can be a single processing unit or a multiple processing unit that includes more than one processing component. In some embodiments, the processing unit 402 is or includes the processing component(s) 106 (shown in FIG. 1).

The memory 404 communicates with the processing unit 402 via the system bus 412. The memory 404 can include a single memory component or multiple memory components. In some embodiments, the memory 404 is operatively connected to a memory controller (not shown) that enables communication with the processing unit 402 via the system bus 412. The memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or OSX families of operating systems from APPLE CORPORATION, the FREEBSD family of operating systems, the SOLARIS family of operating systems from ORACLE CORPORATION, other operating systems, and the like. In some embodiments, the memory 404 is or includes the memory component(s) 112 (also shown in FIG. 1).

The program modules 416 may include various software and/or program modules described herein. In some embodiments, for example, the program modules 416 can include the pictogram digitization module 108, the application(s) 110, or both. In some embodiments, multiple implementations of the computer system 400 can be used, wherein each implementation is configured to execute one or more of the program modules 416. The program modules 416 and/or other programs can be embodied in computer-readable media containing instructions that, when executed by the processing unit 402, perform the method 300 described above. According to embodiments, the program modules 416 may be embodied in hardware, software, firmware, or any combination thereof. The memory 404 also can be configured to store the pictogram database 124 and/or other data disclosed herein.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium," "computer-readable storage medium," and variations thereof does not include waves or signals per se and/or communication media, and therefore should be construed as being directed to "non-transitory" media only.

The user interface devices 406 may include one or more devices with which a user accesses the computer system 400. The user interface devices 406 may include, but are not limited to, computers, servers, personal digital assistants, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, an electronic stylus, and/or the camera component 120. Further, the I/O devices 408 may include one or more output devices, such as, but not limited to, the display component 122.

The network devices 410 enable the computer system 400 to communicate with other networks or remote systems via the network 126. Examples of the network devices 410 include, but are not limited to, a modem, a radio frequency ("RF") or infrared ("IR") transceiver, a telephonic interface, a bridge, a router, or a network card. The network 126 may include a wireless network such as, but not limited to, a WLAN such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 126 may be a wired network such as, but not limited to, a WAN, LAN, a wired Personal Area Network ("PAN"), or a wired Metropolitan Area Network ("MAN").

Figure 5:
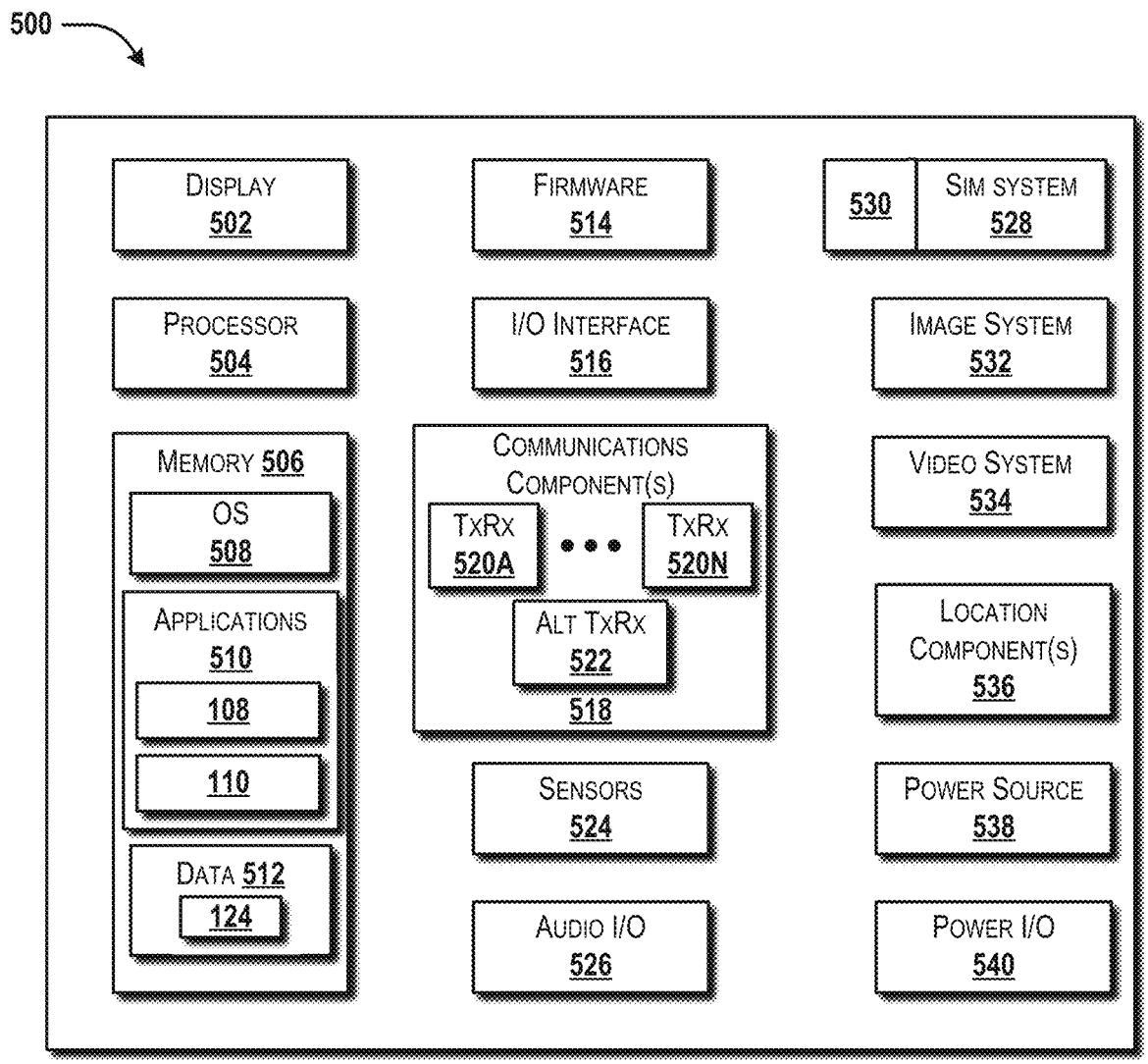
FIG. 5 is a block diagram illustrating an example mobile device, according to some illustrative embodiments.

Turning now to FIG. 5, an illustrative mobile device 500 and components thereof will be described. In some embodiments, the user system 102 is configured the same as or similar to the mobile device 500. In some embodiments, the other system(s) 128 is/are configured the same as or similar to the mobile device 500. While connections are not shown between the various components illustrated in FIG. 5, it should be understood that some, none, or all of the components illustrated in FIG. 5 can be configured to interact with one another to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display the digital interface(s) 116, various GUI elements, text, images, video, virtual keypads and/or keyboards, messaging data, notification messages, metadata, Internet content, device status, time, date, calendar data, device preferences, map and location data, combinations thereof, and/or the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510 (e.g., the pictogram digitization module 108 and/or the applications 110), other computer-executable instructions stored in the memory 506, or the like. In some embodiments, the applications 510 also can include a UI application (not illustrated in FIG. 5). In some embodiments, the processor 504 is or includes the processing component and the memory 506 is or includes the memory component 112.

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering/deleting data, entering and setting user IDs and passwords for device access, configuring settings, manipulating content and/or settings, multimode interaction, interacting with other applications 510, and otherwise facilitating user interaction with the operating system 508, the applications 510, and/or other types or instances of data 512 that can be stored at the mobile device 500.

The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, presence status information, user IDs, passwords, and application initiation (start-up) requests. In some embodiments, the I/O interface 516 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks, such as the network(s) 126 (shown in FIG. 1). In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments, one or more of the transceivers of the communications component 518 may be configured to communicate using Global System for Mobile communications ("GSM"), Code-Division Multiple Access ("CDMA") CDMAONE, CDMA2000, Long-Term Evolution ("LTE") LTE, and various other 2G, 2.5G, 3G, 4G, 4.5G, 5G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiple Access ("OFDMA"), Space-Division Multiple Access ("SDMA"), and the like.

In addition, the communications component 518 may facilitate data communications using General Packet Radio Service ("GPRS"), Enhanced Data services for Global Evolution ("EDGE"), the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content such as a live video image of the pictograms 114 and the surface 118. In some embodiments, the video system 534 is or includes the camera component(s) 120.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted-GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 500 or other devices or computers described herein, such as the computer system 400 described above with reference to FIG. 4.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 500 in order to store and execute the software components presented herein. It is also contemplated that the mobile device 500 may not include all of the components shown in FIG. 5, may include other components that are not explicitly shown in FIG. 5, or may utilize an architecture completely different than that shown in FIG. 5.

Figure 6:
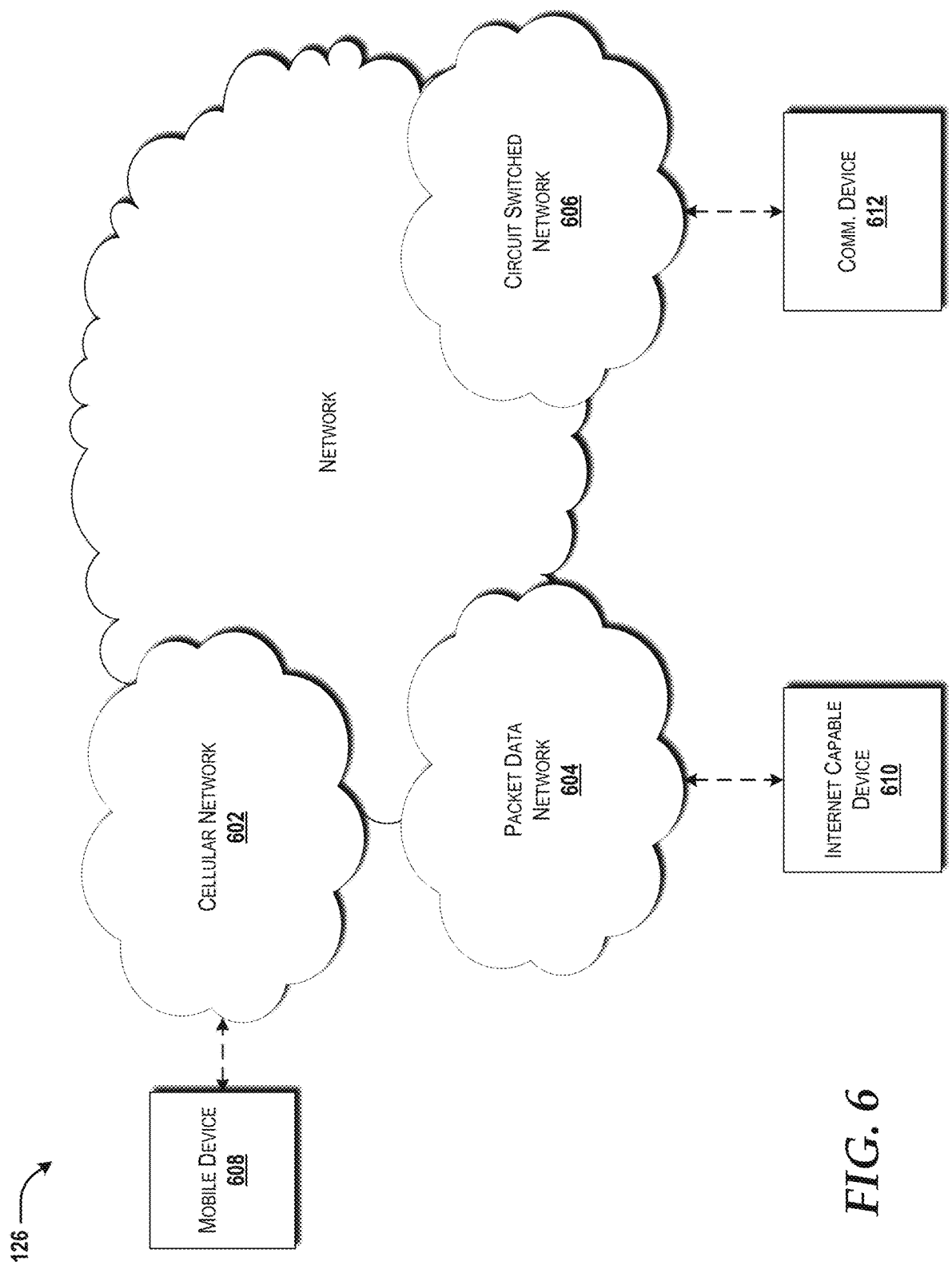
FIG. 6 schematically illustrates a network, according to an illustrative embodiment.

Turning now to FIG. 6, details of the network 126 are illustrated, according to an illustrative embodiment. The network 126 includes a cellular network 602, a packet data network 604, and a circuit switched network 606. The user system 102 and the other system(s) 128 can communicate via the network 126.

The cellular network 602 can include various components such as, but not limited to, base transceiver stations ("BTSs"), Node-Bs or e-Node-Bs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, the user system 102, a cellular telephone, a user equipment, a mobile terminal, a PDA, a laptop computer, a handheld computer, and combinations thereof, can be operatively connected to the cellular network 602. The mobile communications device 608 can be configured similar to or the same as the mobile device 500 described above with reference to FIG. 5.

The cellular network 602 can be configured as a GSM network and can provide data communications via GPRS and/or EDGE. Additionally, or alternatively, the cellular network 602 can be configured as a 3G Universal Mobile Telecommunications System ("UMTS") network and can provide data communications via the HSPA protocol family, for example, HSDPA, EUL, and HSPA+. The cellular network 602 also is compatible with 4G mobile communications standards such as LTE, 5G mobile communications standards, or the like, as well as evolved and future mobile standards.

The packet data network 604 includes various systems, devices, servers, computers, databases, and other devices in communication with one another, as is generally known. In some embodiments, the packet data network 604 is or includes one or more WI-FI networks, each of which can include one or more WI-FI access points, routers, switches, and other WI-FI network components. The packet data network 604 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system ("POTS"). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610 such as the user system 102, the other system(s) 128, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610.

Figure 7:
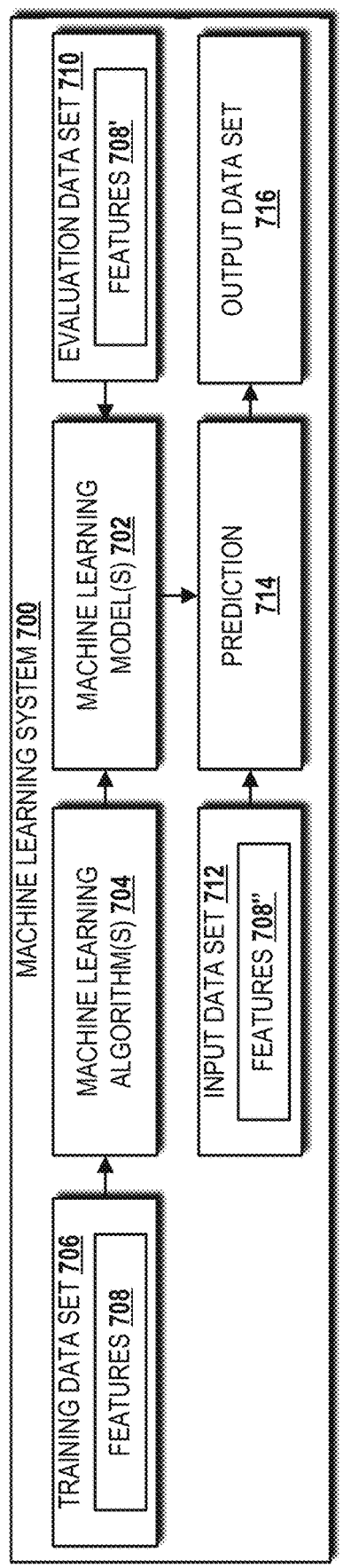
FIG. 7 is a diagram illustrating a machine learning system, according to an illustrative embodiment.

Turning now to FIG. 7, a machine learning system 700 capable of implementing aspects of the embodiments disclosed herein will be described. In some embodiments, aspects of the pictogram digitization module 108 can be enhanced through the use of machine learning and/or artificial intelligence applications. For example, machine learning can be used to identify the pictograms 114. Accordingly, the user system 102 can include the machine learning system 700 or can be in communication with the machine learning system 700.

The illustrated machine learning system 700 includes one or more machine learning models 702. The machine learning models 702 can include supervised and/or semi-supervised learning models. The machine learning model(s) 702 can be created by the machine learning system 700 based upon one or more machine learning algorithms 704. The machine learning algorithm(s) 704 can be any existing, well-known algorithm, any proprietary algorithms, or any future machine learning algorithm. Some example machine learning algorithms 704 include, but are not limited to, neural networks, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 704 based upon the problem(s) to be solved by machine learning via the machine learning system 700.

The machine learning system 700 can control the creation of the machine learning models 702 via one or more training parameters. In some embodiments, the training parameters are selected modelers at the direction of an enterprise, for example. Alternatively, in some embodiments, the training parameters are automatically selected based upon data provided in one or more training data sets 706. The training parameters can include, for example, a learning rate, a model size, a number of training passes, data shuffling, regularization, and/or other training parameters known to those skilled in the art. The training data in the training data sets 706.

The learning rate is a training parameter defined by a constant value. The learning rate affects the speed at which the machine learning algorithm 704 converges to the optimal weights. The machine learning algorithm 704 can update the weights for every data example included in the training data set 706. The size of an update is controlled by the learning rate. A learning rate that is too high might prevent the machine learning algorithm 704 from converging to the optimal weights. A learning rate that is too low might result in the machine learning algorithm 704 requiring multiple training passes to converge to the optimal weights.

The model size is regulated by the number of input features ("features") 708 in the training data set 706. A greater the number of features 708 yields a greater number of possible patterns that can be determined from the training data set 706. The model size should be selected to balance the resources (e.g., compute, memory, storage, etc.) needed for training and the predictive power of the resultant machine learning model 702.

The number of training passes indicates the number of training passes that the machine learning algorithm 704 makes over the training data set 706 during the training process. The number of training passes can be adjusted based, for example, on the size of the training data set 706, with larger training data sets being exposed to fewer training passes in consideration of time and/or resource utilization. The effectiveness of the resultant machine learning model 702 can be increased by multiple training passes.

Data shuffling is a training parameter designed to prevent the machine learning algorithm 704 from reaching false optimal weights due to the order in which data contained in the training data set 706 is processed. For example, data provided in rows and columns might be analyzed first row, second row, third row, etc., and thus an optimal weight might be obtained well before a full range of data has been considered. By data shuffling, the data contained in the training data set 706 can be analyzed more thoroughly and mitigate bias in the resultant machine learning model 702.

Regularization is a training parameter that helps to prevent the machine learning model 702 from memorizing training data from the training data set 706. In other words, the machine learning model 702 fits the training data set 706, but the predictive performance of the machine learning model 702 is not acceptable. Regularization helps the machine learning system 700 avoid this overfitting/memorization problem by adjusting extreme weight values of the features 708. For example, a feature that has a small weight value relative to the weight values of the other features in the training data set 706 can be adjusted to zero.

The machine learning system 700 can determine model accuracy after training by using one or more evaluation data sets 710 containing the same features 708' as the features 708 in the training data set 706. This also prevents the machine learning model 702 from simply memorizing the data contained in the training data set 706. The number of evaluation passes made by the machine learning system 700 can be regulated by a target model accuracy that, when reached, ends the evaluation process and the machine learning model 702 is considered ready for deployment.

After deployment, the machine learning model 702 can perform a prediction operation ("prediction") 714 with an input data set 712 having the same features 708" as the features 708 in the training data set 706 and the features 708' of the evaluation data set 710. The results of the prediction 714 are included in an output data set 716 consisting of predicted data. The machine learning model 702 can perform other operations, such as regression, classification, and others. As such, the example illustrated in FIG. 7 should not be construed as being limiting in any way.

Figure 8:
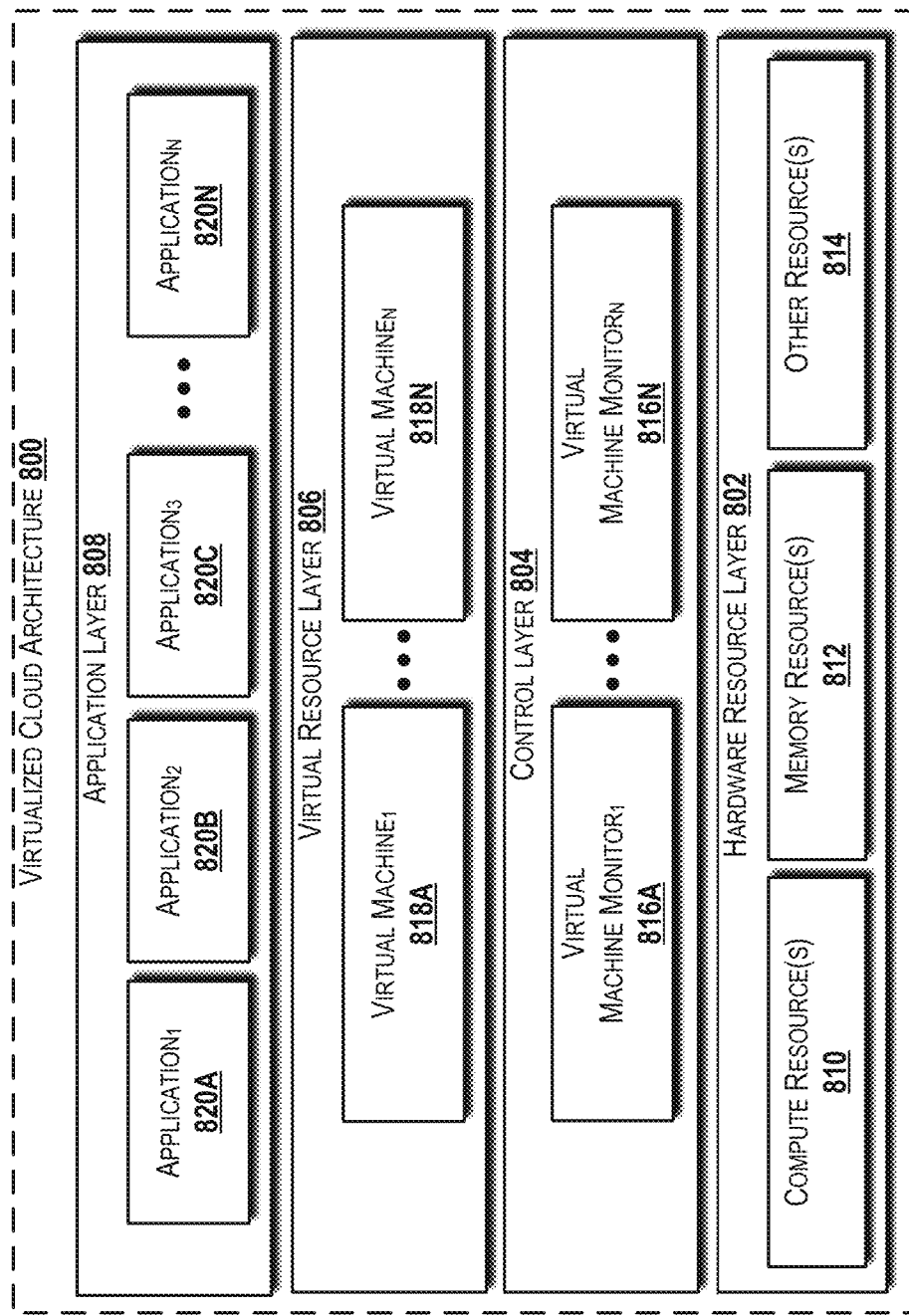
FIG. 8 is a block diagram illustrating an example virtualized cloud architecture and components thereof capable of implementing aspects of the embodiments presented herein.

Turning now to FIG. 8, a block diagram illustrating an example virtualized cloud architecture 800 and components thereof will be described, according to an exemplary embodiment. The virtualized cloud architecture 800 can be utilized to implement various elements disclosed herein. In some embodiments, the user system 102 and/or the other system(s) 128 can be implemented, at least in part, in the virtualized cloud architecture 800 or can communicate with the virtualized cloud architecture 800 to perform operations described herein.

The virtualized cloud architecture 800 is a shared infrastructure that can support multiple services and network applications. The illustrated virtualized cloud architecture 800 includes a hardware resource layer 802, a control layer 804, a virtual resource layer 806, and an application layer 808 that work together to perform operations as will be described in detail herein.

The hardware resource layer 802 provides hardware resources, which, in the illustrated embodiment, include one or more compute resources 810, one or more memory resources 812, and one or more other resources 814. The compute resource(s) 810 can include one or more hardware components that perform computations to process data, and/or to execute computer-executable instructions of one or more application programs, operating systems, and/or other software. The compute resources 810 can include one or more central processing units ("CPUs") configured with one or more processing cores. The compute resources 810 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 810 can include one or more discrete GPUs. In some other embodiments, the compute resources 810 can include CPU and GPU components that are configured in accordance with a co-processing CPU/GPU computing model, wherein the sequential part of an application executes on the CPU and the computationally-intensive part is accelerated by the GPU. The compute resources 810 can include one or more system-on-chip ("SoC") components along with one or more other components, including, for example, one or more of the memory resources 812, and/or one or more of the other resources 814. In some embodiments, the compute resources 810 can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources 810 can be or can include one or more hardware components architected in accordance with an advanced reduced instruction set computing ("RISC") machine ("ARM") architecture, available for license from ARM HOLDINGS. Alternatively, the compute resources 810 can be or can include one or more hardware components architected in accordance with an x86 architecture, such an architecture available from INTEL CORPORATION of Mountain View, Calif., and others. Those skilled in the art will appreciate the implementation of the compute resources 810 can utilize various computation architectures, and as such, the compute resources 810 should not be construed as being limited to any particular computation architecture or combination of computation architectures, including those explicitly disclosed herein.

The memory resource(s) 812 can include one or more hardware components that perform storage operations, including temporary or permanent storage operations. In some embodiments, the memory resource(s) 812 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 810.

The other resource(s) 814 can include any other hardware resources that can be utilized by the compute resources(s) 810 and/or the memory resource(s) 812 to perform operations described herein. The other resource(s) 814 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 802 can be virtualized by one or more virtual machine monitors ("VMMs") 816A-816N (also known as "hypervisors;" hereinafter "VMMs 816") operating within the control layer 804 to manage one or more virtual resources that reside in the virtual resource layer 806. The VMMs 816 can be or can include software, firmware, and/or hardware that alone or in combination with other software, firmware, and/or hardware, manages one or more virtual resources operating within the virtual resource layer 806.

The virtual resources operating within the virtual resource layer 806 can include abstractions of at least a portion of the compute resources 810, the memory resources 812, the other resources 814, or any combination thereof. These abstractions are referred to herein as virtual machines ("VMs"). In the illustrated embodiment, the virtual resource layer 806 includes VMs 818A-818N (hereinafter "VMs 818"). Each of the VMs 818 can execute one or more applications 820A-820N in the application layer 808.

Based on the foregoing, it should be appreciated that aspects of pictograms as digitally recognizable tangible controls have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
    initializing, by a user system comprising a processing component, a pictogram digitization module;
    capturing, by the user system via a camera component, a static image containing a pictogram that is a digitally recognizable tangible manifestation of a digital control, wherein the pictogram is on a physical surface;
    determining, by the user system via the pictogram digitization module, the digital control associated with the pictogram;
    creating, by the user system via the pictogram digitization module, a digital interface comprising the digital control, wherein the digital interface is useable via a physical interaction with the physical surface;
    capturing, by the user system via the camera component, a video image of the physical interaction with the physical surface; and
    implementing, by the user system via the pictogram digitization module, the digital control based upon the video image of the physical interaction with the physical surface.

2. The method of claim 1, wherein determining, by the user system via the pictogram digitization module, the digital control associated with the pictogram comprises performing, by the user system via the pictogram digitization module, a lookup operation on a pictogram database, wherein the pictogram database comprises identifying information about the pictogram in association with the digital control.

3. The method of claim 2, wherein the digital control comprises a digital content, an action, or a context.

4. The method of claim 1, wherein the pictogram comprises a formal pictogram.

5. The method of claim 1, wherein the pictogram comprises an informal pictogram.

6. The method of claim 1, wherein the physical surface comprises an inoperable electronic device.

7. The method of claim 6, wherein the inoperable electronic device comprises an inoperable computer mouse.

8. A user system comprising:
    a processing component; and
    a memory component comprising computer-executable instructions of a pictogram digitization module stored thereon that, when executed by the processing component, cause the processing component to perform operations comprising initializing the pictogram digitization module, capturing, via a camera component, a static image containing a pictogram that is a digitally recognizable tangible manifestation of a digital control, wherein the pictogram is on a physical surface, determining the digital control associated with the pictogram, creating a digital interface comprising the digital control, wherein the digital interface is useable via a physical interaction with the physical surface, capturing, via the camera component, a video image of the physical interaction with the physical surface, and implementing the digital control based upon the video image of the physical interaction with the physical surface.

9. The user system of claim 8, wherein determining the digital control associated with the pictogram comprises performing a lookup operation on a pictogram database, wherein the pictogram database comprises identifying information about the pictogram in association with the digital control.

10. The user system of claim 9, wherein the digital control comprises a digital content, an action, or a context.

11. The user system of claim 8, wherein the pictogram comprises a formal pictogram.

12. The user system of claim 8, wherein the pictogram comprises an informal pictogram.

13. The user system of claim 8, wherein the physical surface comprises an inoperable electronic device.

14. The user system of claim 13, wherein the inoperable electronic device comprises an inoperable computer mouse.

15. A computer-readable storage medium having computer-executable instructions stored thereon that, when executed by a processing component of a user system, cause the processing component to perform operations comprising:

initializing a pictogram digitization module;

capturing, via a camera component, a static image containing a pictogram that is a digitally recognizable tangible manifestation of a digital control, wherein the pictogram is on a physical surface;

determining the digital control associated with the pictogram;

creating a digital interface comprising the digital control, wherein the digital interface is useable via a physical interaction with the physical surface;

capturing, via the camera component, a video image of the physical interaction with the physical surface; and implementing the digital control based upon the video image of the physical interaction with the physical surface.

16. The computer-readable storage medium of claim 15, wherein determining the digital control associated with the pictogram comprises performing a lookup operation on a pictogram database, wherein the pictogram database comprises identifying information about the pictogram in association with the digital control.

17. The computer-readable storage medium of claim 16, wherein the digital control comprises a digital content, an action, or a context.

18. The computer-readable storage medium of claim 15, wherein the pictogram comprises a formal pictogram or an informal pictogram.

19. The computer-readable storage medium of claim 15, wherein the physical surface comprises an inoperable electronic device.

20. The computer-readable storage medium of claim 19, wherein the inoperable electronic device comprises an inoperable computer mouse.

* * * * *